United States Patent
Matsumoto et al.

(10) Patent No.: US 6,733,174 B2
(45) Date of Patent: May 11, 2004

(54) SEMICONDUCTOR TEMPERATURE DETECTING METHOD AND ITS CIRCUIT

(75) Inventors: Toru Matsumoto, Tochigi-ken (JP); Yasuhiro Mori, Tochigi-ken (JP)

(73) Assignee: Nippon Precision Circuits Inc., Tokyo (JP)

( * ) Notice: Subject to any disclaimer, the term of this patent is extended or adjusted under 35 U.S.C. 154(b) by 158 days.

(21) Appl. No.: 09/918,913

(22) Filed: Jul. 31, 2001

(65) Prior Publication Data

US 2002/0014675 A1 Feb. 7, 2002

(30) Foreign Application Priority Data

Aug. 4, 2000 (JP) ........................................ 2000-237104

(51) Int. Cl.$^7$ ................................................ G01K 7/01
(52) U.S. Cl. ........................................ 374/178; 374/183
(58) Field of Search .................................. 374/178, 183

(56) References Cited

U.S. PATENT DOCUMENTS

| | | | | | |
|---|---|---|---|---|---|
| 5,024,535 A | * | 6/1991 | Winston, Jr. | ............... | 374/178 |
| 5,063,342 A | * | 11/1991 | Hughes et al. | ............. | 323/315 |
| 5,070,322 A | * | 12/1991 | Fujihira | ................... | 340/653 |
| 5,224,777 A | * | 7/1993 | Hayashi et al. | ............. | 374/172 |
| 5,982,221 A | * | 11/1999 | Tuthill | ....................... | 327/512 |
| 6,149,299 A | * | 11/2000 | Aslan et al. | ................ | 374/178 |
| 6,225,851 B1 | * | 5/2001 | Descombes | ................. | 327/512 |
| 6,255,891 B1 | * | 7/2001 | Matsuno et al. | ............ | 327/512 |
| 6,554,469 B1 | * | 4/2003 | Thomson et al. | ........... | 374/178 |
| 2001/0026576 A1 | * | 10/2001 | Beer et al. | .................. | 374/141 |

FOREIGN PATENT DOCUMENTS

JP          05248962 A     *   9/1993    ............ G01K/7/00

* cited by examiner

Primary Examiner—Diego Gutierrez
Assistant Examiner—Lydia M. De Jesús
(74) Attorney, Agent, or Firm—Jordan and Hamburg LLP

(57) ABSTRACT

A semiconductor temperature detecting circuit use semiconductor temperature sensors each comprising bipolar transistors connected in a Darlington connection to provide a semiconductor temperature detecting circuit capable of automatically compensating for variations in fabrication of a reference voltage for comparing outputs of temperature sensors. The semiconductor temperature detecting circuit includes a first and a second semiconductor temperature sensor each having bipolar transistors connected in Darlington connection and respectively receiving different constant currents (I and nxI). Temperature detected is based on a corresponding relationship between a ratio of output voltages of the first and the second semiconductor temperature sensors and the temperature.

3 Claims, 5 Drawing Sheets

FIG. 8
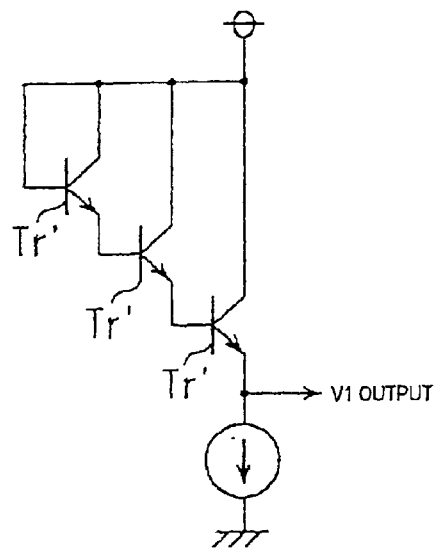
FIG. 9
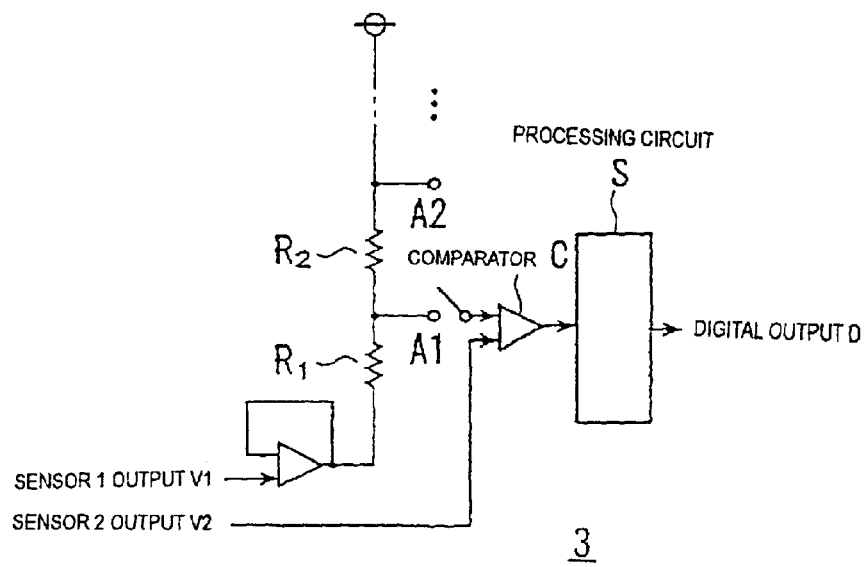
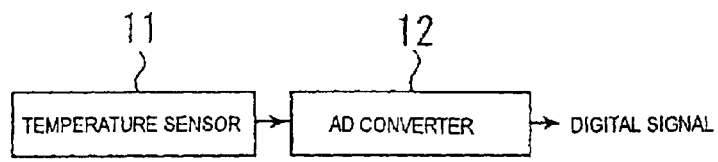
FIG. 10
PRIOR ART

PRIOR ART

US 6,733,174 B2

SEMICONDUCTOR TEMPERATURE DETECTING METHOD AND ITS CIRCUIT

BACKGROUND OF THE INVENTION

The present invention relates to a method of detecting temperature using a semiconductor device and the circuit thereof which dispenses with a need for a reference voltage which needs to be adjusted. Particularly, the invention relates to a method of detecting temperature using a semiconductor device having a circuit comprising a semiconductor temperature sensor and an AD converter capable of being utilized in an integrated circuit such as a temperature compensated type crystal oscillator (TCXO) having a function of a temperature detector.

DESCRIPTION OF THE RELATED ART

When temperature is detected in an integrated circuit to thereby provide a digital signal in correspondence with the temperature, there is generally constructed a constitution in which an output of a semiconductor temperature sensor 11 is converted by an AD converter 12 as shown by FIG. 10.

As the semiconductor temperature sensor 11, there is used a circuit in which a constant current source is connected to an emitter terminal of transistors connected in Darlington connection as shown by FIG. 11 (refer to Japanese Patent No. 2946306 or Japanese Patent Laid-Open No. 248962/1993).

In order to convert an output Vout of the sensor 11 into a digital signal by using the AD converter 12, as shown by FIG. 12, comparison voltage Vref produced from a certain reference voltage and the sensor output voltage Vout are compared by a comparator to thereby provide the digital value in correspondence with the sensor output voltage Vout (comparison system AD converter).

According to the conventional circuit shown by FIG. 12, the sensor output voltage is compared with the certain reference voltage. Although the reference voltage is generated by a reference voltage source such as bandgap reference, the voltage varies from reference to reference due to fabrication variations, and the output value of the AD converter varies accordingly. Therefore, in order to meet the need for a reference voltage source having high accuracy, adjustment by a trimming step after fabrication is required. That is, according to the conventional circuit, the absolute value of the reference voltage is utilized and therefore, there is needed an adjusting step for compensating for fabrication variances and there poses a problem that the circuit is complicated by that amount and the number of steps is increased.

SUMMARY OF THE INVENTION

It is an object of the invention to provide a semiconductor temperature detecting circuit with high accuracy and capable of ensuring absolute accuracy of detecting temperature with no need for a reference voltage to thereby dispense with steps of adjusting for fabrication variations, such as trimming.

In order to achieve the above-described object, according to the invention, there is constructed a constitution of comparing output voltages of two temperature sensors in place of a constitution of comparing output voltage of a temperature sensor and reference voltage.

That is, according to an aspect of the invention, there is provided a semiconductor temperature detecting circuit comprising a first and a second semiconductor temperature sensor, means for supplying different constant currents to the first and the second semiconductor temperature sensors, and means for detecting temperature based on a corresponding relationship between a ratio of output voltages of the first and the second semiconductor temperature sensors and the temperature.

In the circuit according to the aspect of the invention, there may be constructed a constitution in which the first and the second semiconductor temperature sensors are formed at portions of the same semiconductor substrate proximate to each other and there are respectively provided bipolar transistors connected in Darlington connection having differing numbers of stages for each sensor.

In the circuit according to the aspect of the invention, there may be constructed a constitution in which the means for detecting the temperature comprises a voltage dividing circuit for dividing the output voltage of the first semiconductor temperature sensor by a predetermined ratio, a comparator receiving an output voltage of the first semiconductor temperature sensor divided by the voltage dividing circuit as a first input and receiving an output voltage of the second semiconductor temperature sensor as a second input, and a processing circuit for detecting the temperature based on an output of the comparator and the corresponding relationship between the ratio of the output voltages of the first and the second semiconductor sensors and the temperature.

In the circuit according to the aspect of the invention, there may be constructed a constitution in which the voltage dividing circuit outputs divided voltages of the output voltage of the first semiconductor temperature sensor corresponding to a plurality of the predetermined ratios and the comparator successively receives the plurality of divided voltages at the first input and successively compares the first input with the second input.

Or, in the circuit according to the aspect of the invention, there may be constructed a constitution in which the dividing circuit outputs divided voltages of the output voltage of the first semiconductor temperature sensor according to a plurality of the predetermined ratios and there are present comparators corresponding in number to the plurality of output voltages of the dividing circuit which respective receive the plurality of divided voltages to the first inputs of the respective comparators and simultaneously compare the first inputs with the second input.

In the circuit according to the aspect of the invention, there may be constructed a constitution in which the processing circuit outputs the detected temperature as a digital signal.

In the circuit according to the aspect of the invention, there may be constructed a constitution in which the semiconductor substrate is of a conductive type of a P type or an N type.

Further, according to another aspect of the invention, there is provided a method of detecting temperature by a semiconductor device comprising the steps of providing a first and a second semiconductor sensor, supplying different constant currents to the first and the second semiconductor temperature sensors, calculating a corresponding relationship between a ratio of output voltages of the first and the second semiconductor temperature sensors and temperature, and detecting the temperature based on the corresponding relationship.

In the method according to the another aspect of the invention, there may be constructed a constitution in which the step of providing the first and the second semiconductor temperature sensors includes a step of providing bipolar transistors connected in Darlington configurations having differing numbers of stages of each sensor and which are provided on a same semiconductor substrate.

In the method according to the another aspect of the invention, there may be constructed a constitution in which the step of detecting the temperature further comprising the steps of dividing the output voltage of the first semiconductor temperature sensor by a predetermined ratio, comparing the divided output voltage of the first semiconductor temperature sensor as a first input and the output voltage of the second semiconductor temperature sensor as a second input, and detecting the temperature based on a result of the comparison and the corresponding relationship between a ratio of output voltages of the first and the second semiconductor temperature sensors and temperature.

In the method according to the another aspect of the invention, there may be constructed a constitution in which the step of dividing the output voltage further comprising the steps of dividing the output voltage by a plurality of the predetermined ratios, successively applying the plurality of divided voltages to the first input and successively comparing the first input with the second input.

Or, in the method according to the another aspect of the invention, there may be constructed a constitution in which the step of dividing the output voltage further comprising the steps of dividing the output voltage by a plurality of the predetermined ratios, and simultaneously applying the plurality of divided voltages to first inputs of comparators and simultaneously comparing the first input with the second input.

The two semiconductor temperature sensors according to the invention are respectively constituted by bipolar type transistors connected in Darlington connection. Current values of constant current sources of the two temperature sensors are set to values different from each other. Therefore, although output voltages V1 and V2 of the two temperature sensors change with regard to temperature T, temperature coefficients thereof differ as shown by a graph of FIG. 1. A change in a ratio V2/V1 of the two output voltages with regard to the temperature T is as shown by a graph of FIG. 2. As shown by the graph of FIG. 2, the voltage ratio V2/V1 is provided with temperature dependency.

Therefore, temperature can be detected by comparing and using the output voltages V1 and V2 of the respective temperature sensors. When the two sensors are constituted by elements having the same shape on the same chip and arranged at a short distance therebetween, there is achieved a tracking effect respectively indicating variations in characteristics in the same direction with regard to fabrication variations and when the output ratio V2/V1 of the two sensors is adopted, the variations in fabrication are canceled by each other and there is shown a temperature characteristic which is little affected by variations in fabrication. The output ratio V2/V1 is shown by the graph of FIG. 2.

BRIEF DESCRIPTION OF THE DRAWINGS

FIG. 8 is a circuit diagram of a first temperature sensor of a semiconductor temperature detecting circuit according to other embodiment of the invention;

FIG. 9 is a circuit diagram of an AD converter of the semiconductor temperature detecting circuit according to other embodiment of the invention;

FIG. 10 is a block diagram showing a total constitution of a conventional semiconductor temperature detecting circuit;

DETAILED DESCRIPTION OF THE PREFERRED EMBODIMENTS

A detailed explanation will be given of embodiments of the invention based on examples in reference to the attached drawings as follows.

Figure 3:
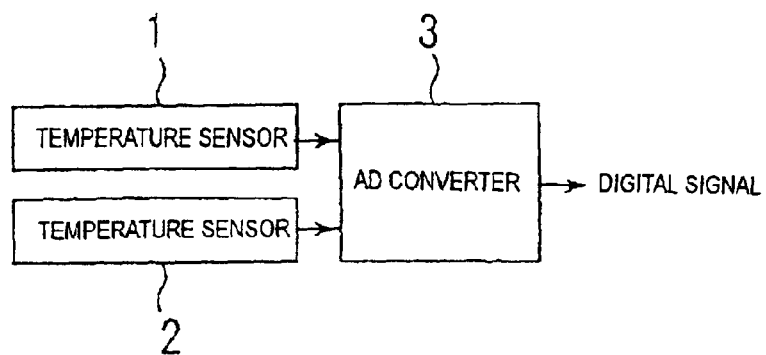
FIG. 3 is a block diagram showing a total constitution of a semiconductor temperature detecting circuit according to an embodiment of the invention.

FIG. 3 shows a total constitution of a temperature detecting circuit according to an embodiment of the invention. The temperature detecting circuit is constituted by two temperature sensors 1 and 2 and one AD converter 3.

Figure 4:
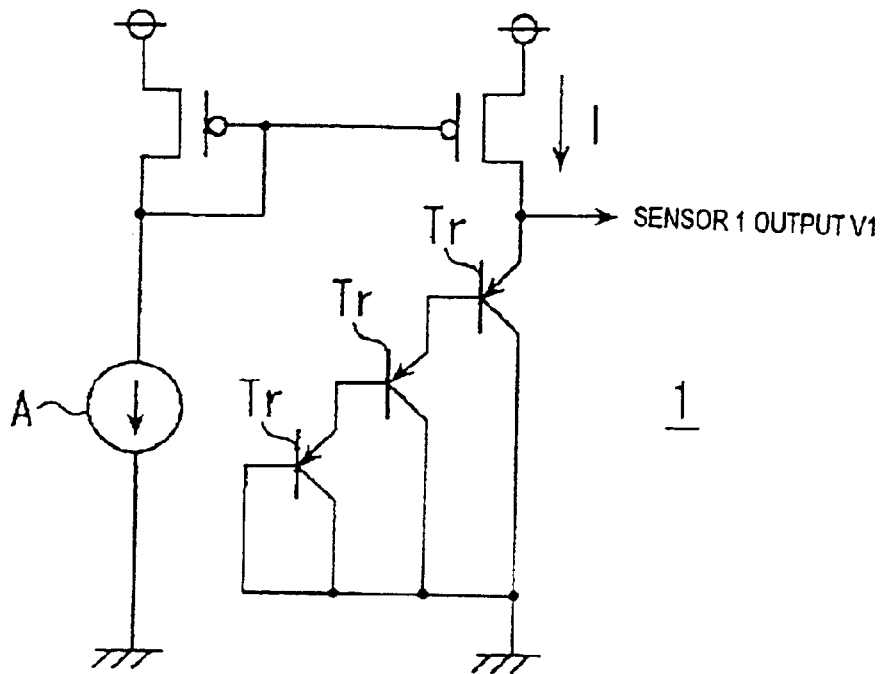
FIG. 4 is a circuit diagram of a first, temperature sensor of the semiconductor temperature detecting circuit according to the embodiment of the invention.
Figure 11:
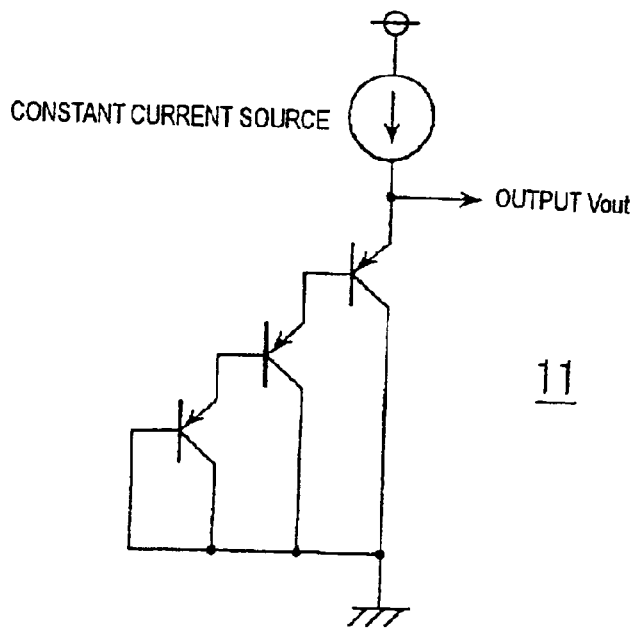
FIG. 11 is a circuit diagram of a conventional transistor temperature sensor connected in Darlington connection.
Figure 12:
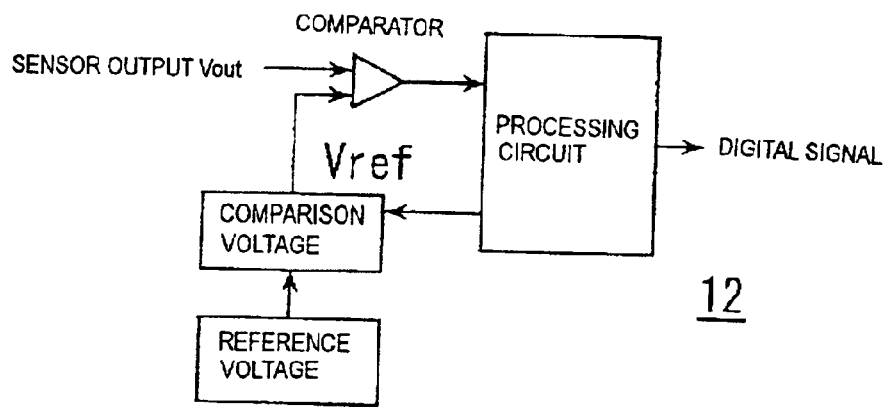
FIG. 12 is a block diagram of an AD converter used in the conventional semiconductor temperature detecting circuit.

FIG. 4 shows a circuit of the temperature sensor 1. The temperature sensor 1 of FIG. 4 is the same as that shown in FIG. 11 as the conventional technology. The circuit of the temperature sensor 1 is constituted by N stages (3 stages in this case) of PNP type bipolar transistors Tr connected in Darlington connection and a constant current source A for supplying constant current I thereto. There are used a pair of transistors in a current mirror configuration for supplying the constant current I to the bipolar transistor Tr at the topmost stage in the Darlington connection. One of the pair of transistors in the current mirror constitution is connected to the bipolar transistor Tr at the topmost stage in Darlington connection and other thereof is connected to the constant current source A.

Figure 5:
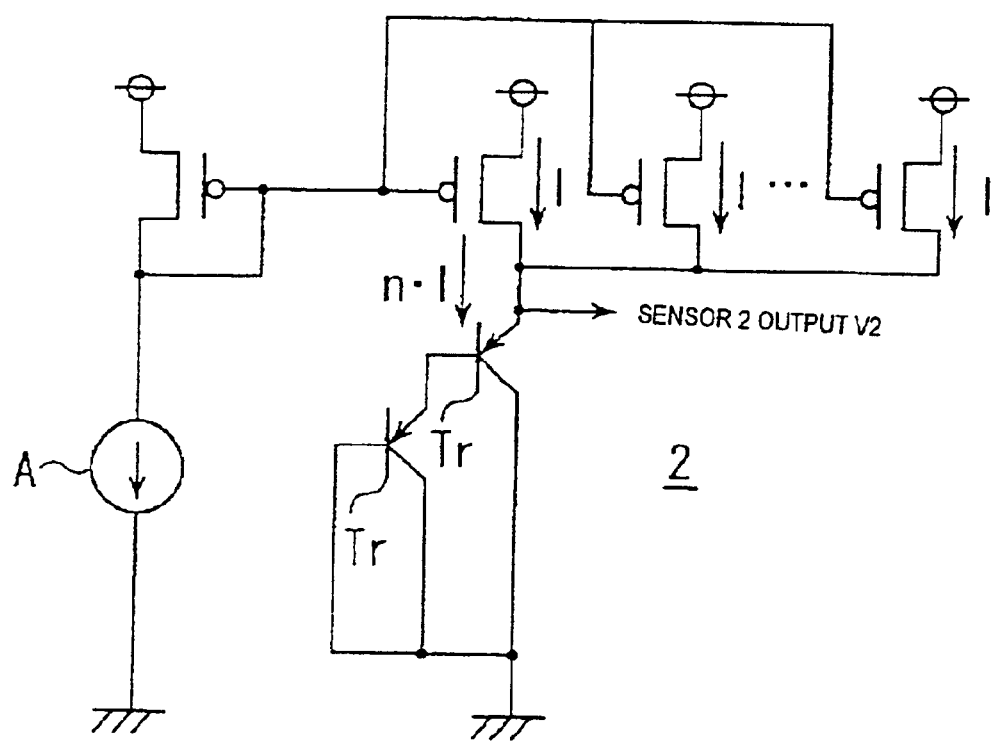
FIG. 5 is a circuit diagram of a second temperature sensor of the semiconductor temperature detecting circuit according to the embodiment of the invention.

FIG. 5 shows a circuit of the temperature sensor 2. In order to enlarge a ratio of outputs V2/V1 of the temperature sensors 1 and 2, a number of stages of PNP type bipolar transistors Tr in Darlington connection of the circuit of the temperature sensor 2 is set to about (N−1) stages (2 stages in this case) which differs from the N stages of the temperature sensor 1. Further, in order to change the temperature coefficient, the transistor Tr at the topmost stage of Darlington connection of the temperature sensor 2, is supplied with constant current nxI which is n times as much as the constant current of the sensor 1. That is, in FIG. 5, there are provided (n+1) pieces of transistors in a current mirror constitution the same as that in FIG. 4. One of the transistors in the current mirror constitution is connected to the constant current source A and remaining n pieces of the transistors are connected in parallel with the transistor Tr at the topmost stage in Darlington connection.

The number of stages of the transistors in the circuit of the temperature sensor 1 is N which is larger than the number of stages (N−1) of the circuit of the temperature sensor 2 and therefore, output voltage V1 of the circuit of the temperature sensor 1 is higher than output voltage V2 of the temperature sensor 2. Further, the constant current value I in the circuit of the temperature sensor 1 is smaller than the constant current value nxI of the circuit of the temperature sensor 2 and therefore, an absolute value of a change in the output voltage by temperature per transistor of the circuit of the temperature sensor 1, that is, the temperature coefficient becomes larger.

Figure 1:
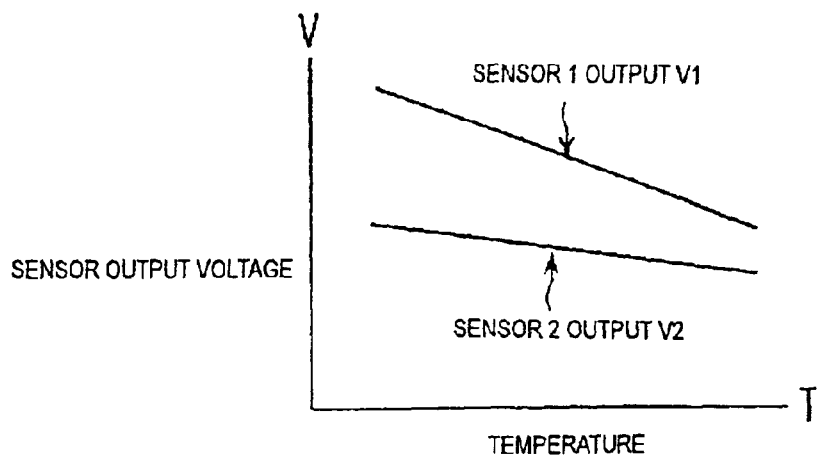
FIG. 1 is a graph showing a relationship between output voltages of two temperature sensors and temperature for explaining the principle of a semiconductor temperature detecting method and its circuit according to the invention.

As a result, temperature characteristics of the outputs V1 and V2 of the temperature sensor 1 and the temperature sensor 2 are as shown by a graph of FIG. 1. Further, a temperature characteristic of a ratio of outputs of the temperature sensors (output voltage V2 of temperature sensor 2/output voltage V1 of temperature sensor 1), is as shown by a graph of FIG. 2.

Figure 2:
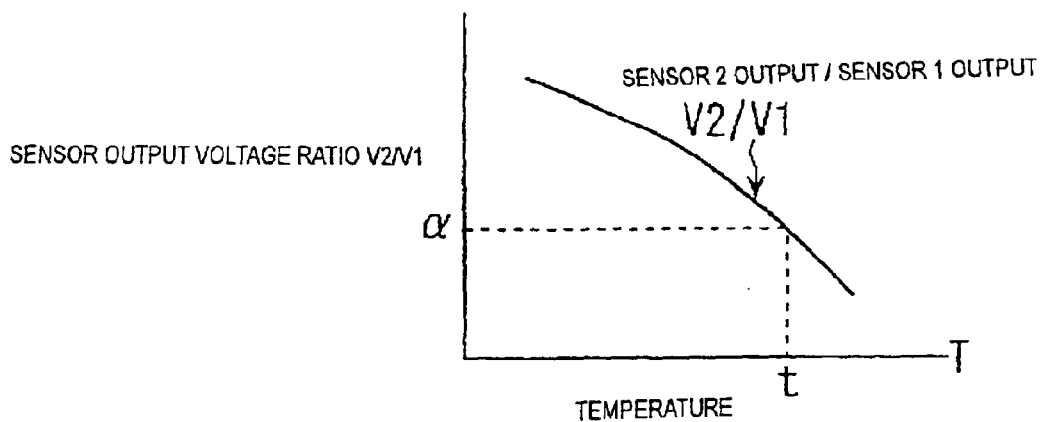
FIG. 2 is a graph showing a relationship between a ratio of output voltages of two temperature sensors and temperature for explaining the principle of the semiconductor temperature detecting method and its circuit according to the invention.

The ratio of outputs V2/V1 of the temperature sensors shown in the graph of FIG. 2, is provided with a temperature change characteristic which is little affected by fabrication variations as described above. Therefore, even when there is not carried out the adjustment such as trimming after fabrication for compensating for the variations in fabrication, high temperature detection accuracy can be realized.

Figure 6:
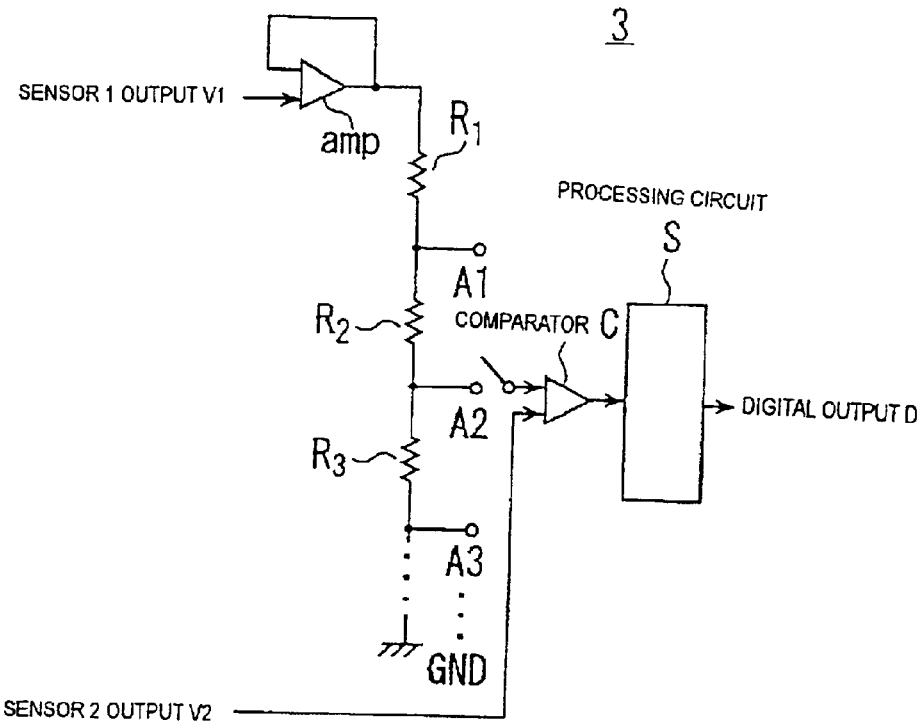
FIG. 6 is a circuit diagram of an AD converter of the semiconductor temperature detecting circuit according to the embodiment of the invention.

FIG. 6 shows a constitution of the AD converter 3 used in the temperature detecting circuit according to the embodiment. A side of the output V1 of the temperature sensor 1 is connected to resistors and connected to an amplifier amp for driving a comparator C. A plurality of resistors R1, R2, R3, . . . are connected in series between an output of the amplifier amp and ground GND and a plurality of resistor taps A1, A2, A3, . . . are provided among the resistors. There is provided a voltage divided output of the temperature sensor 1 from the taps which is compared with the output V2 of the temperature sensor 2 and a processing circuit S detects temperature by an output of the comparator C and digitizes thereof and outputs a digital signal D.

The voltage divided outputs of the sensor 1 are generated from the resistor taps A1, A2, A3 . . . . For example, a divided voltage outputted from the resistor tap A1 is provided with a value of the output V1 of the sensor 1 multiplied by a divided voltage ratio of the resistor tap A1 (1−R1/Rtotal). Here, notation R1 designates a resistance value of the resistor R1 and notation Rtotal designates a resistance value of a total of all the resistors R1, R2, R3, . . . between the amplifier amp and the ground GND. A divided voltage outputted from an n (n=1, 2, 3, . . . )-th resistor tap An (not illustrated) is provided with the value of the output V1 of the sensor 1 multiplied by a divided voltage ratio (1−Rn/Rtotal). Here, notation Rn designates a sum of resistance values of the resistors R1, R2, R3, . . . , Rn (not illustrated) and notation Rtotal designates the resistance value of the total of all the resistors R1, R2, R3, . . . between the amplifier amp and the ground GND.

The graph of FIG. 2 shows the relation of temperature T to the sensor output ratio V2/V1. Based on the relationship, a range of temperature intended to be detected is previously divided in a predetermined number and there are provided taps An having divided voltage ratios (1−Rn/Rtotal) equal to output ratios a of temperature t in individual ranges by a number dividing the temperature range intended to be detected. Further, as shown by FIG. 6, one input of the comparator C is connected successively to the taps A, A2, A3, . . . and voltage produced by dividing the output V1 by a predetermined ratio from the respective tap An, is compared with the output V2 of the temperature sensor 2.

In FIG. 6, the respective taps A1, A2, A3, . . . , are scanned successively from top to bottom (or, conversely, from bottom to top) at predetermined time intervals and the output V1 of the sensor 1 divided by the corresponding predetermined divided voltage ratio is successively supplied from the respective tap to the one input terminal of the comparator C. The other input terminal of the comparator C is supplied with the output V2 of the sensor 2. When the divided output V1 of the sensor 1 is the same as the output V2 of the sensor 2 by scanning in this way, the output of the comparator C is inverted. For example, the output of the comparator C is inverted from positive to negative or from logical high to logical low or in a reverse direction of these. At this occasion, there is provided temperature t in correspondence with the output ratio a the same as the divided voltage ratio of the tap An from the corresponding relationship of the graph of FIG. 2. In this way, the temperature t in correspondence with the output ratio a is detected based on the relationship of the graph of FIG. 2 by the processing circuit S and is outputted as the digital signal D.

Figure 7:
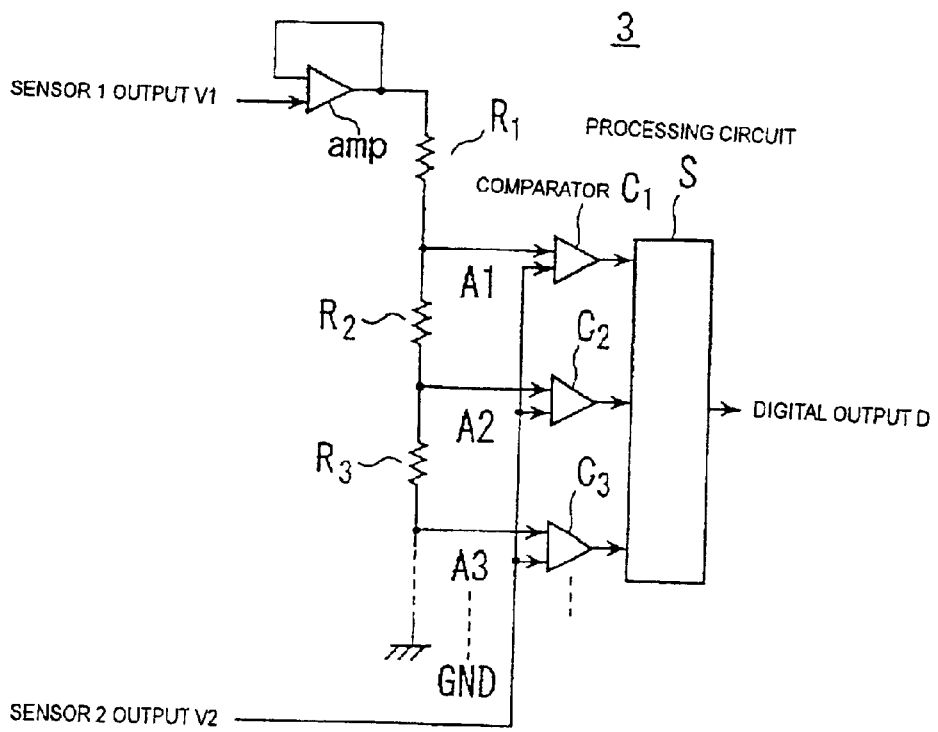
FIG. 7 is a circuit diagram of an AD converter of a semiconductor temperature detecting circuit according to other embodiment of the invention.

FIG. 7 shows a constitution of the AD converter 3 according to another embodiment of the invention. According to the AD converter, there are provided a plurality of comparators C1, C2, C3, . . . equal in number to the number of dividing the temperature range intended to be detected. Input terminals of the respective comparators C1, C2, C3, . . . on one side are successively connected with divided ones of the output V1 of the sensor 1 from the respective resistor taps A1, A2, A3, . . . . The output V2 from the sensor 2 is connected to the other input terminals of the respective comparators C1, C2, C3, . . . . Output terminals of the respective comparators C1, C2, C3, . . . are connected to the processing circuit S. The processing circuit S simultaneously processes the outputs of the respective comparators C1, C2, C3, . . . .

The processing circuit S finds a comparator Cn (not illustrated) at which a value thereof is inverted among outputs of the plurality of comparators C1, C2, C3, . . . (for example, from positive to negative or from binary value high to binary value low, or in a direction reverse to these) from output values of comparators directly therebefore and directly thereafter. It is regarded that the comparator Cn at which the output value is inverted, is connected to a tap An at which a voltage divided value of the output value V1 of the sensor 1 and the output value V2 of the sensor 2 coincide with each other. Therefore, temperature T in correspondence with the divided voltage ratio a of the tap An can be regarded as a detected temperature based on the corresponding relationship of the graph previously indicated by FIG. 2. The processing circuit S monitors the outputs of the plurality of comparators C1, C2, C3, . . . , detects the comparator Cn at which the value is inverted from the outputs of the comparators and detects temperature t in correspondence with the divided voltage ratio α of the tap An connected to the comparator Cn. The processing circuit S outputs the digital signal D representing the detected temperature t. Other portions of the AD converter of FIG. 7 are the same as that of FIG. 6 and therefore, an explanation thereof will be omitted by attaching the same reference notation.

According to the embodiment of FIG. 7, the plurality of divided voltage values of the output voltage V1 of the sensor 1 and the output voltage V2 of the sensor 2 are simultaneously compared by using the plurality of comparators and therefore, temperature can be detected at a speed higher than that of the first embodiment in which these are compared by successively scanning thereof.

As described above, according to the semiconductor temperature detecting circuit and its method of the invention, the divided value of the output voltage V1 of the temperature sensor 1 is used as the reference voltage for comparison. The output voltage V1 of the temperature sensor 1 and the output voltage V2 of the temperature sensor 2 are provided with a tracking effect in which the characteristics are varied in the same direction by variations in fabrication. Therefore, when there is adopted the output voltage ratio V2/V1 of the two temperature sensors, the variations in fabrication are automatically compensated for and canceled. Therefore, there is dispensed with the reference voltage source with high accuracy which requires adjustment of the temperature sensor per se such as trimming and adjustment of trimming for the comparators of the AD converter according to the invention.

FIG. 8 and FIG. 9 show still other embodiment of the invention. The temperature sensor according to the above-described embodiment shown by FIG. 4 through FIG. 7, is constituted by the PNP transistors when the P-type conductive type semiconductor substrate is used. However, FIG. 8 shows a configuration having a three Darlington stage connection of NPN transistors Tr used for the temperature sensor 1 when an N-type conductive type semiconductor substrate is used. A two stage Darlington connection of NPN transistors is used for the temperature sensor 2 when the N-type conductive type semiconductor substrate is used, and can similarly be realized easily by a skilled person in the art and therefore, an explanation thereof will be omitted. FIG. 9 shows a constitution of the AD converter 3 used in the embodiment. Voltage dividing resistors R1, R2, . . . for comparison voltage of the comparator C of the AD converter 3, are provided between VDD and the output V1 of the temperature sensor 1.

Further, although according to the embodiment of the invention shown by FIG. 4 and FIG. 5, the two temperature sensors 1 and 2 are respectively constituted by the constitutions of 3 stages and 2 stages of Darlington connection, numbers of the stages need not be limited thereto but the numbers of stages of transistors of the two temperature sensors can be changed. When the numbers of stages are changed in this way, the output voltage ratio of the two temperature sensors differs from that shown in the graph of FIG. 2.

Further, although according to the embodiment of the invention shown by FIG. 6 and the like, the AD conversion system is constituted by the comparison system, the AD conversion system can be realized also by an integration system. For example, according to a double integration type, integration of inputs may be carried out by output of the temperature sensor 1 and integration of reference source may be carried out by output of the temperature sensor 2.

According to the constitution of the invention, the variation in the temperature detection characteristic caused by the variations in fabrication, is compensated for by combining the two temperature sensors and utilizing the tracking effect of outputs thereof. Therefore, there is dispensed with a reference voltage source circuit having high absolute accuracy which needs to adjust trimming of the temperature sensor per se and adjust the trimming, small area formation and low power consumption formation of a product can be achieved, further, adjusting steps can be omitted and therefore, the fabrication cost can also be reduced.

What is claimed is:

1. A semiconductor temperature detecting circuit comprising:
   a first and a second semiconductor temperature sensor;
   means for supplying different constant currents to the first and the second semiconductor temperature sensors; and
   means for detecting temperature based on a corresponding relationship between a ratio of output voltages of the first and the second semiconductor temperature sensors and the temperature; the means for detecting the temperature comprising:
   a voltage dividing circuit for dividing the output voltage of the first semiconductor temperature sensor by a predetermined ratio;
   a comparator for inputting the output voltage of the first semiconductor temperature sensor divided by the voltage dividing circuits as a first input and inputting the output voltage of the second semiconductor temperature sensor as a second input; and
   a processing circuit for detecting the temperature based on an output of the comparator and the corresponding relationship;
   wherein the voltage dividing circuit outputs divided voltages by a plurality of the predetermined ratios and the comparator successively provides the plurality of divided voltages to the first input and successively compares the first input with the second input.

2. The semiconductor temperature detecting circuit according to claim 1:
   wherein the first and the second semiconductor temperature sensors include respectively bipolar transistors connected in Darlington connection by numbers of stages different from each other on a same semiconductor substrate.

3. A method of detecting temperature by a semiconductor device comprising the steps of;
   providing a first and a second semiconductor temperature sensor;
   supplying different constant currents to the first and the second semiconductor temperature sensors;
   calculating a corresponding relationship between a ratio of output voltages of the first and the second semiconductor temperature sensors and temperature; and
   detecting the temperature based on the corresponding relationship;
   the step of providing the first and the second semiconductor temperature sensors includes a step of providing the first and the second semiconductor sensors respectively having bipolar transistors connected in Darlington connection by numbers of stages different from other on a same semiconductor substrate;
   the step of detecting the temperature further comprising the steps of;
   dividing the output voltage of the first semiconductor temperature sensor by a predetermined ratio;
   comparing the divided output voltage of the first semiconductor temperature sensor as a first input and the output voltage of the second semiconductor temperature sensor as a second input; and
   detecting the temperature based on a result of the comparison and the corresponding relationship;
   the step of dividing the output voltage of the first semiconductor temperature sensor by the predetermined ratio further comprising the steps of:
   dividing the output voltage of the first semiconductor temperature sensor by a plurality of the predetermined ratios; and
   successively constituting the first input by the plurality of divided voltages and successively comparing the first input with the second input.

* * * * *